(No Model.)

T. A. CROWELL.
Seed and Corn Planter.

No. 230,244. Patented July 20, 1880.

WITNESSES:
A. L. Ourand,
H. Aubrey Toulmin.

INVENTOR:
Thomas A. Crowell.
By Alexander Toulmin,
ATTORNEYS.

N. PETERS, PHOTO-LITHOGRAPHER, WASHINGTON, D C.

UNITED STATES PATENT OFFICE.

THOMAS A. CROWELL, OF BOSTON, MASSACHUSETTS.

SEED AND CORN PLANTER.

SPECIFICATION forming part of Letters Patent No. 230,244, dated July 20, 1880.

Application filed April 3, 1880. (No model.)

*To all whom it may concern:*

Be it known that I, THOMAS A. CROWELL, of Boston, in the county of Suffolk, and in the State of Massachusetts, have invented certain new and useful Improvements in Seed and Corn Planters; and I do hereby declare that the following is a full, clear, and exact description thereof, reference being had to the accompanying drawings, and to the letters of reference marked thereon, making a part of this specification.

My invention relates to that class of seed-planters in which a rotating hopper is employed; and it consists in providing a cylindrical rotating hopper having a series of equidistant seed-openings with a laterally and axially adjustable band which may be moved so as to uncover all the openings in the hopper, and turned so as to uncover only three or five of said openings, or any other desired number, as will be hereinafter more fully set forth.

In order to enable others skilled in the art to which my invention appertains to make and use the same, I will now proceed to describe its construction and operation, referring to the annexed drawings, in which—

Figure 1:
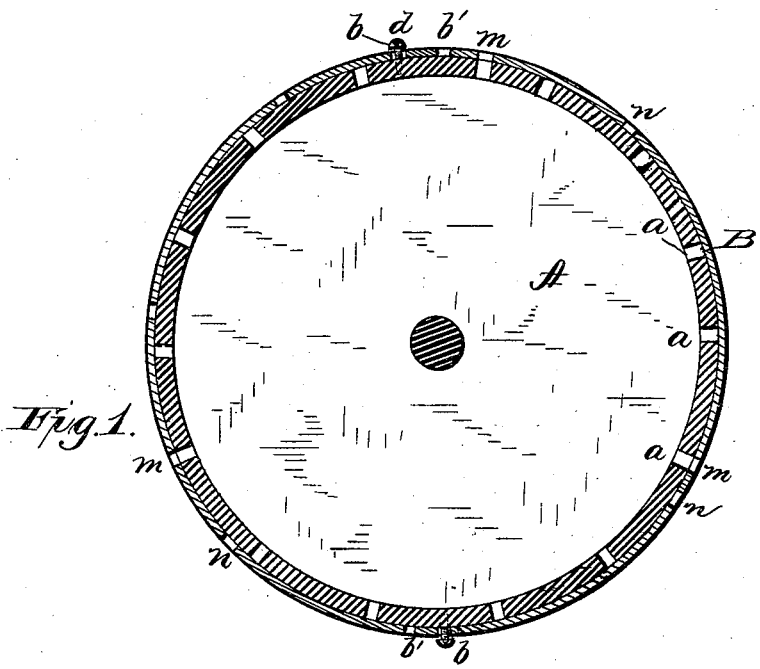
Figure 2:
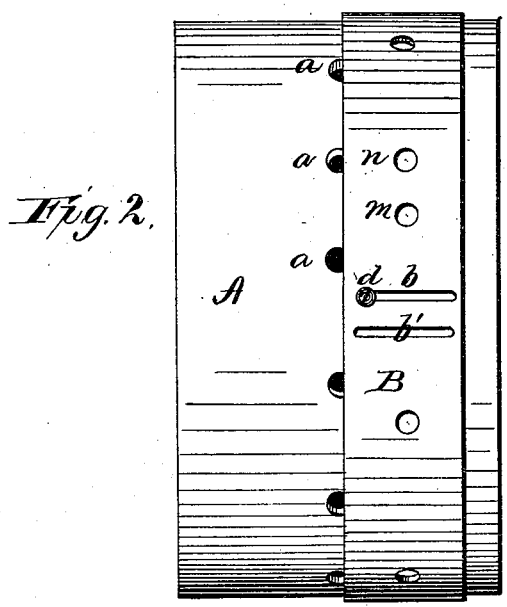

Figure 1 is a central longitudinal section of my invention. Fig. 2 is a side view of the same.

A represents a cylindrical rotating hopper for seed-planters, provided with fifteen seed-openings, $a\ a$, arranged in a circle around the center of the hopper, at equal distances apart. Around this drum or hopper is placed a band, B, which has two slots, $b\ b'$, on two opposite sides. Through one of these slots, on each side, is passed a screw, $d$, into the hopper, which screws prevent any axial movement of the band, while they permit a lateral movement, so as to cover or uncover the seed-openings $a$.

In the band B are made two sets of openings, $m$ and $n$. The openings $m$ are three in number, and the openings $n$ are five in number, each being equidistant and so arranged with relation to the slots $b\ b'$ that when the screws $d\ d$ are in the slots $b\ b$ the band may be moved to cover all the seed-openings $a$ except three.

By removing the screws $d$ and turning the band axially, so as to replace the screws in the same holes in the hopper through the slots $b'$, the band will be so adjusted that five openings in the hopper will be uncovered.

It will thus be seen that with a driving-wheel fifteen feet in circumference I can, with the same hopper, drop the seed one foot apart, three feet, or five feet, as desired.

If the hopper is made with, say, twelve seed-openings, the band may be made with three sets of holes to drop two, three, or four times for each revolution, in which case the band should have three sets of slots for axial adjustment.

I am aware that a rotating seed-hopper with an axially-adjustable band having varying openings is not new; and I do not claim such, broadly, as my invention; neither do I claim a rotating seed-hopper provided with a band that is laterally movable for opening and closing the seed-openings in the hopper, as I am aware that such is of itself not new.

Having thus fully described my invention, what I claim as new, and desire to secure by Letters Patent, is—

A cylindrical rotating seed-hopper provided in its periphery with a series of equidistant seed-openings and with a laterally and axially adjustable band provided with two or more sets of openings of unequal number, the openings of each set being equidistant, substantially as and for the purposes herein set forth.

In testimony that I claim the foregoing I have hereunto set my hand this 19th day of March, 1880.

T. A. CROWELL.

Witnesses:
H. AUBREY TOULMIN,
H. J. ENNIS.